Dec. 22, 1942. H. K. SCHRAGE 2,306,226
HIGH VOLTAGE POWER TRANSMISSION
Filed Feb. 7, 1941 2 Sheets-Sheet 1
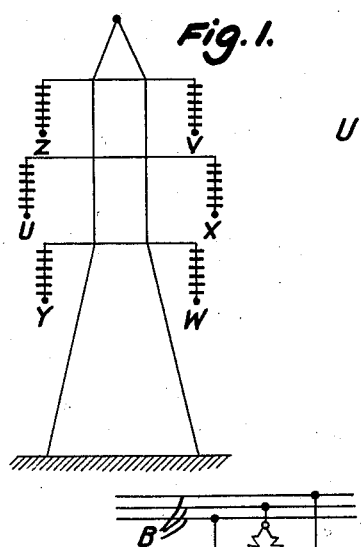
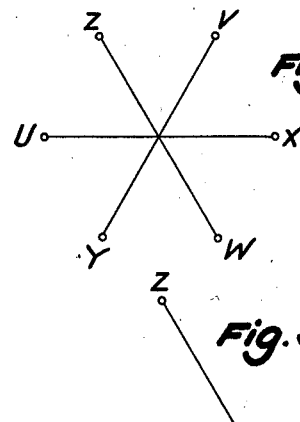
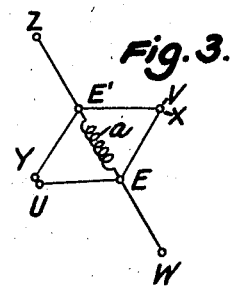
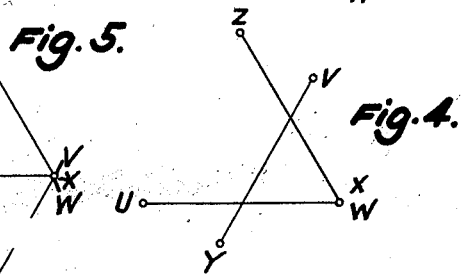
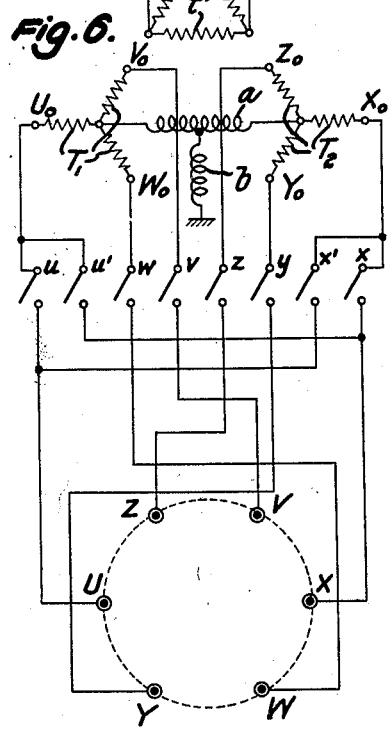
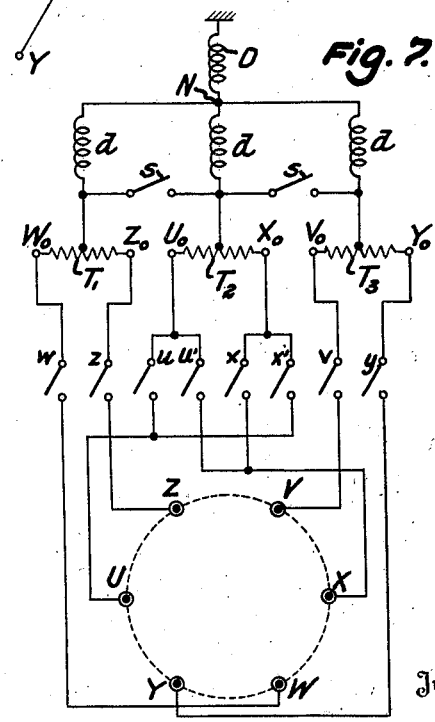
Inventor:
Hidde Klaas Schrage
By Pierce & Scheffler
Attorneys.

Inventor:
Hidde Klaas Schrage
By Pierce + Scheffler
Attorneys.

Patented Dec. 22, 1942

2,306,226

UNITED STATES PATENT OFFICE 2,306,226

HIGH VOLTAGE POWER TRANSMISSION

Hidde Klaas Schrage, Ennetbaden, Switzerland, assignor to Aktiengesellschaft Brown, Boveri & Cie., Baden, Switzerland Application February 7, 1941, Serial No. 377,937
In Switzerland February 10, 1940

11 Claims. (Cl. 171—97)

This invention relates to high voltage transmission lines, and particularly to transmission lines wherein disturbances arising from short circuits are minimized.

Most interruptions in high voltage lines are due to single phase arcing earths (insulator flashovers) caused by excess voltages occurring during lightning disturbances. If the neutral point is earthed a single phase short circuit will occur in the system, resulting in the circuit breaker opening and the supply being interrupted. In most European high voltage transmission systems the neutral point is generally not directly earthed but connected over an earth leakage coil to earth; in most cases single phase arcing earths do not cause the circuit breaker to open because they are extinguished by the aforesaid coils. On the other hand if a short circuit occurs between two or all three phases of the system, an interruption in transmission cannot be prevented even if the system is provided with earth leakage coils.

The object of the present invention is to provide an improved high voltage power transmission system in which short circuits between phases or simultaneous earths in more than one phase line do not generally produce any short circuit currents and therefore no tripping of the circuit breakers. According to the invention this is achieved by passing a six-phase current over six line conductors which are spatially arranged as in a three-phase double line, this current flowing either over two three-phase systems which are not interlinked or over three single-phase systems which are also not interlinked. This arrangement can be still further improved if the capacitive charging currents which occur with the aforementioned short-circuits or earths and flow over the points where the faults occur, are compensated by choking coils when these currents attain dangerous values.

The invention is explained in greater detail by means of the constructional examples illustrated diagrammatically in the accompanying drawings, in which:

Fig. 1 is a diagrammatic representation of a typical six conductor transmission line spatially arranged as a three-phase double line;

Fig. 2 is a vector diagram of the voltages of the six line conductors in normal conditions, when no short circuits or earths exist;

Figs. 3, 4 and 5 are voltage vector diagrams of the six line conductors in different cases of short-circuits between line conductors or in the case of earths of these conductors;

Fig. 6 is a diagrammatic representation of a high voltage transmission system embodying the principles of the invention in which the six line conductors are fed by two three-phase systems not interlinked together;

Figs. 7 and 8 are diagrammatic representations of high voltage transmission systems embodying the principles of the invention, in which the six line conductors are fed by three non-interlinked single-phase systems;

Fig. 9 corresponds to the transmission system shown in Fig. 8.

Figure 8:
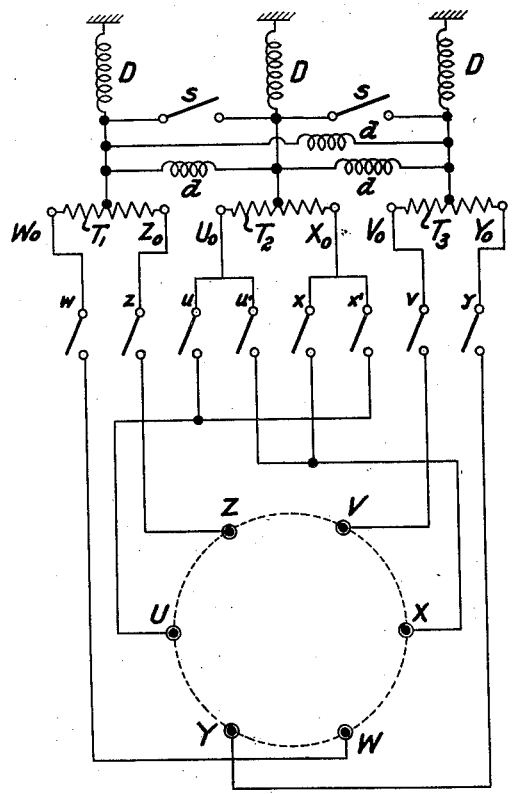

In the Figures 1–9 the six line conductors of the transmission line are designated by UVWXYZ.

It will be obvious to those skilled in the art that in the voltage vector diagrams shown in Figs. 2, 3, 4 and 5 the voltages between the line conductors UVWXYZ are represented by the distances between the corresponding points UVWXYZ of the vector diagrams. So for instance in Fig. 2 showing the voltage vector diagram of the line in normal conditions the distance Z—U represents the voltage between the line conductors Z and U, the distance Z—W represents the voltage between the line conductors Z and W, etc. Comparing vector diagram Fig. 2 with Fig. 1 showing the local arrangement of the phases UVWXYZ on the masts, it is seen that in these figures the relative position of the phases is essentially the same, so that vector diagram Fig. 2 also could represent the local arrangement of the line conductors. This correspondence between vector diagram Fig. 2 and the local arrangement of the conductors has the advantage that in normal working conditions the voltage between adjacent phases is a minimum. Comparing a three phase double line with a six phase line according to the invention, the line voltage to earth being the same in both cases, it will be seen that for the three phase double line the voltage between adjacent phase is $\sqrt{3}$ times as high as for the six phase line.

Fig. 6 represents a high voltage transmission system for which the six line conductors are fed by two three phase systems not interlinked together. The three phase power bus bars B feed the low tension three phase winding $t$ of the power transformer which is provided with two non-interlinked three phase high voltage windings $T_1$ and $T_2$. These high voltage transformer windings $T_1$ and $T_2$ constitute the two non-interlinked three phase feeding systems mentioned before. The high voltage terminals $U_0V_0W_0$ of the winding $T_1$ are connected to the line conductors UVW through the circuit breakers $uvw$; in the same way the high voltage terminals $X_0Y_0Z_0$, of the winding $T_2$ are connected to the line conductors XYZ through the circuit breaker $xyz$. The purpose of the circuit breakers $u'x'$ and of the choke coils $a$ and $b$ will be explained further on.

A very important advantage which exists when the neutral points of the transformer windings $T_1$ and $T_2$ are either not connected with each other at all, or when these neutral points are only connected flexibly over choke coils will now be explained. If in this case a conductive connection between neighboring phases of the transmission line is formed, for instance a flash over between phase V and X occurs, this does not result in a short circuit in one of the three phase systems UVW and XYZ but only in a displacement of the voltages of both three phase systems relative to each other; each of the three phase systems is more or less unaffected and the transmission of power can be continued without interruption. A short circuit between the phase conductors V and X results in a voltage displacement as shown in vector diagram Fig. 3. Between adjacent conductors, for instance between phase Z and V, there will be a voltage equal to $\sqrt{3}\times$ phase voltage, that is to say a voltage equal to that existing with three phase double lines in normal service. When there is an arc between the phase conductors V and X a current flows over this arc which is determined on the one hand by the mutual capacity of the systems UVW and XYZ and on the other hand by the mutual voltage displacement EE' of the neutral points of these systems. If the neutral points E and E' of both systems are for instance connected with each other over a choking coil $a$ (Figs. 3 and 6) the current in the choking coil will also flow over the arc and the choking coil can be dimensioned in such a manner that the capacity current and the choking coil current compensate each other so that the arc extinguishes of its own accord, as is the case with the earth arc in high voltage lines having earth leakage coils. A common earth leakage coil $b$ can be provided for both systems UVW and XYZ independently of the "short-circuit extinguishing coil" $a$ by connecting the coil $b$ to the middle of the coil $a$ as shown in Fig. 6. The coil $a$ then serves at the time as a potential divider for the connection of the earth leakage coil $b$. By using a short circuit extinguishing coil and an earth leakage coil it is thus possible to make certain that the arc is extinguished both in the case of an arcing earth and a short circuit between the neighboring phases of a high voltage line.

To construct a six-phase high voltage power transmission line according to the invention the actual high voltage line itself does not require any alteration and the same high voltage line as for a three-phase double line can be used. The transformers, high-voltage switchgear, etc. can be of standard three-phase or single-phase design. Fig. 6 shows diagrammatically the fundamental system of connections for such a six-phase power transmission arrangement, $t$ being the low voltage windings, of a transformer fed by power bus bars B, $T_1$ and $T_2$ being the high voltage windings of the transformer and $U_0V_0W_0$ and $X_0Y_0Z_0$ being the terminals of the high voltage side of the transformer supplying the high voltage line. The windings $T_1$ and $T_2$ can be located in one and the same transformer. The individual conductors of the high voltage line are designated by UVWXYZ. During normal six-phase operation the switches $uvwxyz$ are closed. If a fault occurs on one of the high voltage conductors which does not disappear again of its own accord, that is if for instance an insulator on the phase conductor U is damaged, then in order to be able to repair or replace this insulator, just as in the case of a three-phase double line, the left half of the high voltage line, that is to say the phase conductors UYZ must be put out of operation and the power is then transmitted temporarily as three-phase current over the phase conductors VWX. This change over is made by opening the switches $uxyz$ and closing the switch $u'$. The transformer windings $T_1$ then supply the conductors VWX and the service is maintained temporarily in this manner. The change over can be made without interrupting the service if first the switches $xyz$ are opened, then the switch $u'$ closed, and finally the switch $u$ opened. With the arrangement shown in Fig. 6, contrary to standard three-phase double systems, a short-circuit between two adjacent phases of the high voltage line does not result in an interruption of the service. If the short-circuit extinguishing or arc suppression coil $a$ is correctly dimensioned a short-circuit arc occurring between both phases will extinguish of its own accord. If on the other hand a short-circuit arc occurs between three adjacent phases of the high voltage line, for instance between the phases VXW, then with this system of connections an interruption will no longer be avoided.

It is, however, also possible to avoid an interruption in the power transmission when a short-circuit occurs between three adjacent phases of the high voltage line, if the six-phase high voltage line is not supplied by two three-phase windings but by a single three-phase winding with open phases which are either not interlinked or are merely connected together by means of choking coils. Fig. 7 shows the diagram of connections to be used in such a case. $U_0X_0, V_0Y_0$ and $W_0Z_0$ represent the high voltage terminals of the transformer windings $T_1$, $T_2$ and $T_3$ supplying the high voltage transmission line, the low voltage winding not being shown. The three phases of the high voltage winding are not interlinked. The mid-points of the three high voltage transformer windings are for instance connected to a choking coil $d$ the neutral point N of which is earthed over the choking coil D. During normal operation the switches $uvwxyz$ are closed and the switches $s$ open. The voltage diagram of the high voltage line in normal operation is shown in Fig. 2. If a short-circuit occurs on the high voltage line, for instance between two adjacent phases W and X a voltage displacement such as is shown in Fig. 4 will result. The service can thus continue without interruption for a time. If the short-circuit arc between W and X disappears then the symmetrical voltage diagram shown in Fig. 2 will be restored. If a short-circuit occurs between the three phases VXW then the voltage will be displaced as shown in Fig. 5. Also in this case the service can be maintained. The six-phase high voltage system arranged as shown in Fig. 7 is therefore to a high degree unaffected by short-circuits. Only when the short-circuit is not restricted to three neighbouring phases is an interruption of the service unavoidable; such a disturbance is, however, extremely improbable. If with the arrangement shown in Fig. 7 one half of the high voltage line, for instance the phases ZUY, has to be made free of voltage to enable a repair to be undertaken, the service can be maintained with three phases over the conductors VXW. The switches $u'vw$ and both switches $s$ are then closed, whilst the remaining switches must be kept open. This change-over can also be accomplished without interrupting the service. The switches $s$ are closed first, switches $xyz$ opened, switch $u'$ closed and finally switch $u$ opened.

During normal undisturbed operation with the arrangement shown in Fig. 7 the three-phase choking coil $d$ and the single-phase choking coil D are free from voltage. If two or three-phase short-circuits of the kind shown in Figs. 4 and 5 respectively occur in the high voltage line an unsymmetrical three-phase voltage forms at the terminals of the three-phase choking coil $d$ so that the neutral point N of the choking coil acquires a voltage equal to the average voltage of the high-voltage line. As long as there are only short-circuits between the phase conductors and no arcs to earth, the average voltage of the high voltage line to earth is zero and the choking coil D is in this case free from voltage. In most cases, however, it will not be just a question of pure short-circuits between phases but rather a combined arcing earth and short-circuit; that is to say the arc will occur simultaneously between two or three phases and also between these phases on the one hand and the earth on the other hand. If in the case illustrated in Fig. 5 there was only a short-circuit between the phase conductors VXW without any earth arc, the voltages according to the diagram (Fig. 5) would adjust themselves with reference to the earth voltage in such a manner that the earth voltage in Fig. 5 would acquire a potential corresponding to the centre of gravity of the six points UVWXYZ, these being assumed to be of equal mass. On the other hand if the short-circuit point VWX has at the same time a short to earth the earth voltage will be displaced to VXW. The neutral point N (Fig. 7) has then no longer earth potential and the choking coil D is under voltage. The three-phase arc suppression coil $d$ must be dimensioned according to the mutual capacity of the six high voltage conductors. The single-phase earth leakage coil D must be dimensioned according to the capacity of the high voltage line with respect to the earth. The arrangement shown in Fig. 7 is therefore effective both as a protection against earths as well as against short-circuits in all cases when one, two or three adjacent phases of the high voltage line have earths or short-circuits or both together.

It is generally necessary to employ the same system of connections for the transformer or transformers at each end of the high voltage line. By means of the arrangement shown diagrammatically in Fig. 7 the order in which the switching operations have to be undertaken so as to be able to change over from six-phase to three-phase operation has been described. It is therefore clear that at the end of the line the order in which the switch operations have to occur is the same as at the beginning of the line. It is therefore expedient to provide means whereby the same switching operations can be performed simultaneously at both ends of the line.

Figure 9:
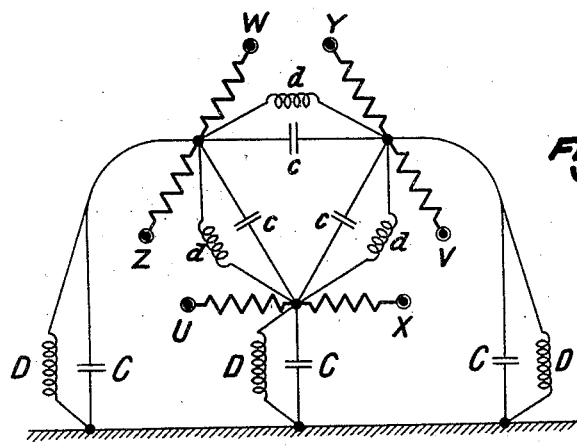
Fig. 9 is a diagrammatic representation of a system showing how in the case of three non-interlinked single phase feeding systems the mutual capacities of the line phases and the capacities of these line phases with respect to earth can be compensated by choking coils.

Fig. 8 shows a modified form of the invention where the choking coils are arranged differently from those shown in Fig. 7, enabling a correct compensation of the individual fault currents to be effected upon the occurrence of short-circuits between phases which are not interlinked and when arcing earths occur on said phases. In the arrangement shown in Fig. 8 the three-phase arc suppression coil $d$ is connected in delta and to the mid-points of the three phases which are not interlinked; three single-phase earth leakage coils D are also connected to the same mid-points, each of the three phases being provided with its own earth leakage coil. Fig. 9 shows the basic diagram of connections for the line capacities and choking coils corresponding to the arrangement shown in Fig. 8, $c$ representing the mutual capacities of the transmission line phases and C the capacities of these phases with respect to earth. Since in this case for each transmission line phase the charging currents can be compensated by the choking coil currents flowing in parallel with the aforesaid charging currents, it is possible to obtain practically complete compensation of the currents at the fault points when short-circuits occur between phases which are not linked together and earthing arcs also occur on these phases.

I claim:

1. A high voltage transmission system comprising six high voltage line conductors spatially arranged as a three-phase double line, at least one step-up transformer at one end of said line, and at least one step-down transformer at the other end of said line, the high voltage windings of said transformers being connected to said conductors to provide a plurality of non-interlinked circuits each comprising an odd number of phases not exceeding three.

2. A high voltage transmission system comprising six high voltage line conductors spatially arranged as a three-phase double line, at least one step-up transformer at one end of said line, and at least one step-down transformer at the other end of said line, the high voltage windings of said transformers being connected to said conductors to provide two non-interlinked three-phase circuits having an electrical phase difference of 180°.

3. A high voltage transmission system comprising six high voltage line conductors spatially arranged as a three-phase double line, at least one step-up transformer at one end of said line, and at least one step-down transformer at the other end of said line, the high voltage windings of said transformers being connected to said conductors to provide three non-interlinked single-phase circuits having an electrical phase difference of 120°.

4. A high voltage transmission system comprising six high voltage line conductors spatially arranged as a three-phase double line, two electrically separated three-phase high voltage transformer windings at each end of said line connected to said conductors to provide two non-interlinked three-phase circuits, and a choke coil at least at one end of the line connecting the neutral points of both of said separated three-phase transformer windings dimensioned to compensate the capacitive charging current at the fault point when a short circuit occurs between any two non-interlinked conductors of the transmission line.

5. A high voltage transmission system comprising six high voltage line conductors spatially arranged as a three-phase double line, two electrically separated three-phase high voltage transformer windings at each end of said line connected to said conductors to provide two non-interlinked three-phase circuits, a choke coil at least at one end of the line connecting the neutral points of both of said separated three-phase transformer windings dimensioned to compensate the capacitive charging current at the fault point when a short circuit occurs between any two non-interlinked conductors of the transmission line, and an earth leakage coil connected to the mid-point of said choke coil.

6. A high voltage transmission system comprising six high voltage line conductors spatially arranged as a three-phase double line, three electrically separated high voltage transformer windings at each end of said line connected to said conductors to provide three non-interlinked single-phase circuits, and a three-phase choke coil at least at one end of the line connecting the mid-points of the three separated single-phase transformer windings dimensioned to compensate the capacitive charging currents at the fault points when a short circuit occurs between any non-interlinked conductors of the transmission line.

7. A high voltage transmission system comprising six high voltage line conductors spatially arranged as a three-phase double line, three electrically separated high voltage transformer windings at each end of said line connected to said conductors to provide three non-interlinked single-phase circuits, a three-phase choke coil at least at one end of the line connecting the mid-points of the three separated single-phase transformer windings dimensioned to compensate the capacitive charging currents at the fault points when a short circuit occurs between any non-interlinked conductors of the transmission line, and an earth leakage coil connected to the neutral point of said choke coil.

8. A high voltage transmission system comprising six high voltage line conductors spatially arranged as a three-phase double line, at least one step-up transformer at one end of said line, at least one step-down transformer at the other end of said line, the high voltage windings of said transformers being connected to said conductors to provide a plurality of non-interlinked circuits each comprising an odd number of phases not exceeding three, and switch means for converting said line to three-phase transmission on three of said conductors.

9. A high voltage transmission system comprising six high voltage line conductors spatially arranged as a three-phase double line, three electrically separated high voltage transformer windings at each end of said line connected to said conductors to provide three non-interlinked single-phase circuits, and earth leakage coils connected to the mid-point of each of the single-phase transformer windings at least at one end of the line.

10. A high voltage transmission system comprising six high voltage line conductors spatially arranged as a three-phase double line, three electrically separated high voltage transformer windings at each end of said line connected to said conductors to provide three non-interlinked single-phase circuits, and single-phase choke coils connecting the mid-points of the three single-phase transformer windings at least at one end of the line.

11. A high voltage transmission system comprising six high voltage line conductors spatially arranged as a three-phase double line, three electrically separated high voltage transformer windings at each end of said line connected to said conductors to provide three non-interlinked single-phase circuits, single-phase choke coils connecting the mid-points of the three single-phase transformer windings at least at one end of the line, and earth leakage coils connected to the mid-point of said single-phase transformer windings.

HIDDE KLAAS SCHRAGE.